(12) United States Patent
Frankel et al.

(10) Patent No.: US 7,343,346 B2
(45) Date of Patent: Mar. 11, 2008

(54) COMPUTER-BASED METHOD AND SYSTEM FOR AIDING TRANSACTIONS

(75) Inventors: Yair Frankel, Ridgewood, NJ (US); David William Kravitz, Alburquerque, NM (US); Charles Thomas Montgomery, Severna Park, MD (US); Marcel Mordechay Yung, New York, NY (US)

(73) Assignee: CertCo, Inc., New York, NY (US)

( * ) Notice: Subject to any disclaimer, the term of this patent is extended or adjusted under 35 U.S.C. 154(b) by 767 days.

(21) Appl. No.: 10/042,335

(22) Filed: Jan. 11, 2002

(65) Prior Publication Data

US 2002/0059143 A1  May 16, 2002

Related U.S. Application Data

(63) Continuation of application No. 09/026,466, filed on Feb. 19, 1998.

(51) Int. Cl.
*G06Q 40/00* (2006.01)

(52) U.S. Cl. .............. 705/44; 705/64; 705/76; 713/156

(58) Field of Classification Search .......... 705/17, 705/39, 40, 44, 76, 64, 75; 235/379, 380; 713/156–158
See application file for complete search history.

(56) References Cited

U.S. PATENT DOCUMENTS

| | | |
|---|---|---|
| 4,823,264 A | 4/1989 | Deming |
| 5,018,196 A | 5/1991 | Takaragi et al. |
| 5,453,601 A | 9/1995 | Rosen ............ 235/379 |
| 5,455,407 A | 10/1995 | Rosen ............ 235/380 |
| 5,666,416 A | 9/1997 | Micali |
| 5,799,086 A | 8/1998 | Sudia ............ 380/23 |
| 5,903,882 A | 5/1999 | Asay et al. .......... 705/44 |
| 6,018,724 A | 1/2000 | Arent ............ 705/44 |

(Continued)

FOREIGN PATENT DOCUMENTS

EP  590 861  4/1994

(Continued)

OTHER PUBLICATIONS

Davis, Jessica, "Novell, Open Market Ink Deal," InfoWorld, V18, n13, p. 6 (1).

(Continued)

*Primary Examiner*—Hani M. Kazimi
(74) *Attorney, Agent, or Firm*—Pillsbury Winthrop Shaw Pittman LLP

(57) ABSTRACT

A method for facilitating provision of a warranty relating to a transaction between two parties in a system which includes an infrastructure composed of a plurality of locations each associated with a respective institution which provides services to clients, the method containing the steps of transmitting a request for a warranty from one party to the transaction which is a client of the respective institution to a respective location associated with the respective institution, which request includes information identifying the other party to the transaction and information about the nature of the transaction conducting an exchange of information between the respective location and a location associated with a institution of which the other party is a client and transmitting a response to the request from the respective location to the one party.

20 Claims, 2 Drawing Sheets

U.S. PATENT DOCUMENTS

| | | | |
|---|---|---|---|
| 6,028,938 A | 2/2000 | Malkin et al. | 380/25 |
| 6,029,150 A | 2/2000 | Kravitz | 705/39 |
| 6,035,402 A | 3/2000 | Vaeth et al. | 713/201 |

FOREIGN PATENT DOCUMENTS

| | | |
|---|---|---|
| WO | 95 23465 A | 8/1995 |
| WO | 96 21192 A | 7/1996 |
| WO | 96/29667 | 9/1996 |
| WO | 96 31965 A | 10/1996 |
| WO | 96 32701 A | 10/1996 |
| WO | WO 9805011 A | 2/1998 |

OTHER PUBLICATIONS

Bellare M. et al., "IKP—A Family of Secure Electronic Payment Protocols", Proceedings of the USENIX Workshop of Electronic Commerce, Jul. 11, 1995, pp. 89-106.

International Search Report dated Jul. 6, 1998.

Paul Kocher, A Quick Introduction to Certificate Revocation Trees (CRTs), A Quick Introduction of CRTs, 3 pgs.

"The Essential Role of Trusted Third Parties in Electronic Commerce", A.M. Froomkin Oregon Law Review, Spring 1996, vol. 75, No. 1, pp. 49-115.

COMPUTER-BASED METHOD AND SYSTEM FOR AIDING TRANSACTIONS

This is a Continuation U.S. application Ser. No. 09/026,466 filed Feb. 19, 1998.

BACKGROUND OF THE INVENTION

The present invention relates to the use of computer systems in connection with transactions, such as financial transactions, and particularly to enhance the ability of parties to enter into substantial transactions with increased security.

Computers and communications technology are coming into wide use as aids to commercial transactions. Transactions such as personal check verifications and credit card purchase authorizations have become everyday experiences.

One type of transaction aid that has been proposed is an offline "identity-based" transaction system in which a Certification Authority (CA) vouches for validity and veracity of data in a user's certificate distinguish between two types of public key signature based transaction systems. Systems of this type utilize state-of-the-art techniques such as public keys, private keys and digital signatures. The role of digital signatures is to replace real-life signatures and allow a user in an "electronic world" to have a mechanism for signing documents. The digital signature identifies the signer and unequivocally associates the signer with the document signed. It provides non-repudiation of the sender and enables transitive passing of authenticated messages. The nature of CA's, public keys, private keys and digital signatures is explained in Schneier, Bruce, *Applied Cryptography*, Second Edition, John Wiley & Sons, Inc. (1996). As used herein, a "user" is a person, or a computer program acting on behalf of a person or a group of persons.

In order to be able to increase the scale of systems that use digital signatures, a mere personal digital signature scheme is not enough. In a crude form, every user must have the "signature verification key" of every other user. Therefore, the notion and architecture of the CA has been suggested. In fact, a CA is an entity that vouches for the correctness of very specific messages, each of which establishes the association of "user identity" with the user's "signature verification key". Thus, a CA architecture is in fact a bootstrapping of the notion of digital signature. The individual users now do not have to have the verification key of each user, instead they can be presented with a signature and a "certificate" where the CA signs the standard message associating a user with a verification key. To this end there are various schemes, including a standard one, described in CCITT Recommendation X.509, 1989.

In a basic CA-based architecture, a certificate is either "pushed" to the user by the signer, or the certificate is "pulled" from the CA by the user. The "or" is not exclusive due to the possibility of revocation of certificates. In any case, we can assume an established "CA architecture" is in existence. For high scalability, there can be a hierarchy of CA's (CA infrastructure). A user will go up the tree-structure to a CA that it trusts. The structure does not have to be a hierarchy and may have more semantics; namely various CA's may deal with certain tasks, key types and transactions.

Systems of the type described above have proven able to support transactions in which it is sufficient to verify the identity of a party, typically a purchaser. However, they do not appear to be well suited for more complex transactions in which one or both parties are obligated to perform specific acts, or to achieve specific goals, or to possess specific characteristics, or qualifications, or credentials, or to have a certain state, or condition. Applicants have observed that in a commercial environment where financial service support for a transaction is needed, there is much more relevant information associated with a transaction than what a certificate provides. Similar considerations apply to a variety of transactions, such as those in which the qualifications, or credentials, of a party must be assured, health care, etc. While the following description of the invention will relate primarily to financial transactions, such transactions should be understood to represent only one exemplary area where the present invention can be used and the scope of the invention is as defined in the appended claims.

BRIEF SUMMARY OF THE INVENTION

It is an object of the present invention to provide a "warranty-granting" system which allows a third-party entity to vouch for a user on a per-transaction basis based on one or more of the user's history, characteristics and state, the term "state" here being intended to refer to the user's condition, status, or qualifications as they relate to the user's ability to complete the transaction.

Another object of the invention is to allow third parties to provide reliable and up-to-date warranties required between entities in many typical commercial transactions.

A further object of the invention is to base the granting and validity of warranties on the nature of the transaction and the characteristics and current states of the parties involved in the transaction.

A further object is to provide for high availability and large transaction volume as in any public key infrastructure that is useable in an electronic commerce environment.

A further object is to provide a supporting infrastructure which can support a large number of simultaneous requests A further object of the invention is to support simultaneous requests in which a single client is requestor and a single client is the subject of the warranty.

In particular, an object of the invention is to enable a given client to request service on a new transaction while waiting for a response on a previously initiated transaction as well as to allow several clients to request warranties with respect to a single subject of warranty at the same time.

Another object of the invention is to provide a system which can support flexible processing in such a way that delays and congestion, which normally would be associated with warranty-based systems, can be minimized or avoided. These delays would be a result of the fact that the local representative may not keep all information locally and may have to obtain extensive verification from other sources. Delays might also be experienced if the decision associated with the issuance of a warranty cannot be automated, i.e., requires human input. The ability to optimally accommodate both completely automated transactions and delayed transactions is an important feature of the system.

The above and other objects according to the invention are achieved by a method for providing a warranty relating to a transaction between two parties, each party having a data communications device, in a system comprising an infrastructure composed of a plurality of locations each associated with a respective institution which provides services to clients, each location having a computer system, a database coupled to the computer system and storing information about each client of the institution and a data communications device coupled to the computer system for communication with the data communications device of any one party, each party being a client of at least one of the institutions, the method comprising:

transmitting a request for a warranty from one party to the transaction which is a client of the respective institution to a respective location associated with the respective institution, which request includes information identifying the other party to the transaction and information about the nature of the transaction;

conducting an exchange of information between the respective location and a location associated with a institution of which the other party is a client; and transmitting a response to the request from the respective location to the one party.

A warranty-granting process according to the invention can be viewed as an augmentation of user certification transactions in a digital signature based context. It melds implicit verification checks on the identity of an obligor, who would be the subject of a warranty, and transaction-specific digital signature authenticity with respect to the subject of the warranty, with access control mechanisms designed to address privacy and warranty-issuance criteria.

The payment of fees for services provided by the supporting infrastructure can be consolidated within the supporting infrastructure. This is required both as a throughput issue and in order to ensure payment for services.

According to one feature of the present invention, only the party requesting a warranty need contact the supporting infrastructure.

According to another feature of the invention, a party who is a client of a particular institution, or local representative, need trust only that local representative. This is a result of the fact that any warranties issued to that client will be issued by his local representative and the fact that release of data concerning him within the supporting infrastructure is controlled by his local representative.

Warranty-granting systems can be implemented in one of several configurations, based on type of transaction and which party pays for the service (of acquiring the warranty).

DETAILED DESCRIPTION OF THE INVENTION

As noted earlier herein, this detailed description is presented with reference to financial transactions only by way of example; the invention can be used beneficially in connection with other types of transactions.

Exchanges of data in support of a financial transaction within a system according to the invention always involves at least three entities. A supporting infrastructure is one of these entities. Such a supporting infrastructure is composed of a plurality of institutions, known as Local Representatives. A transaction will always involve two or more parties outside of the infrastructure. Each party will be a client of one of the Local Representatives in the infrastructure and each such party will be referred to herein as a "client". While the supporting infrastructure can be viewed as a unit, it in fact consists of a variety of financial institutions, including banks, which are geographically separated units.

Figure 1:
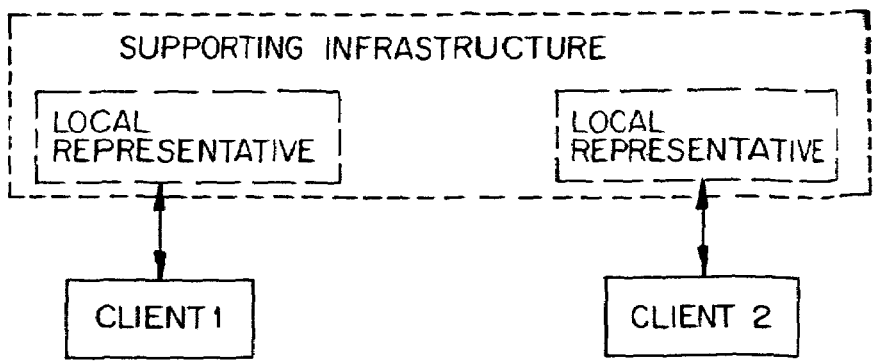
FIG. 1 is a block schematic diagram illustrating a possible connection configuration at a stage preceding a warranty-granting transaction according to the invention.

The clients are assumed to each have a relationship with at least one Local Representative of the infrastructure, such as a business or individual client relationship with a bank. An exemplary relationship, and the corresponding communication links, for two clients, Client 1 and Client 2, is illustrated in FIG. 1. Each client would be connected to its respective local representative in order, for example, to provide the local representative with personal and/or business data which the local representative will subsequently need to participate in a warranty-granting procedure for its client.

Though not represented in FIG. 1, each local representative has connectivity with other local representatives, banks, CA's, insurance companies, underwriters, etc. The local representative may need to provide for an electronic payment system as well as documentation, timestamping and other services.

It is assumed that clients, where appropriate, will periodically receive statements concerning outstanding warranties and related information. This will not be provided on a per-transaction basis, and thus will not be shown in the message flows associated with a specific transaction, an example of which data flows will be described below.

When a warranty is being sought according to the invention, a client can take on any of several roles.

The client may be the party in need of a warranty in order to allow a transaction to go forward and thus is the warrantee. Another client will be the "subject" of the warranty, that is the assurance or warranty is provided with respect to the "subject". While it is possible to provide assurance about a party who is not a client, such cases are of less interest with respect to the types of transactions which are to be supported according to the present invention.

An additional role that a client may take on is that of the requestor of the warranty. The "requester" may be either the warrantee or the subject of the warranty.

Figure 2:
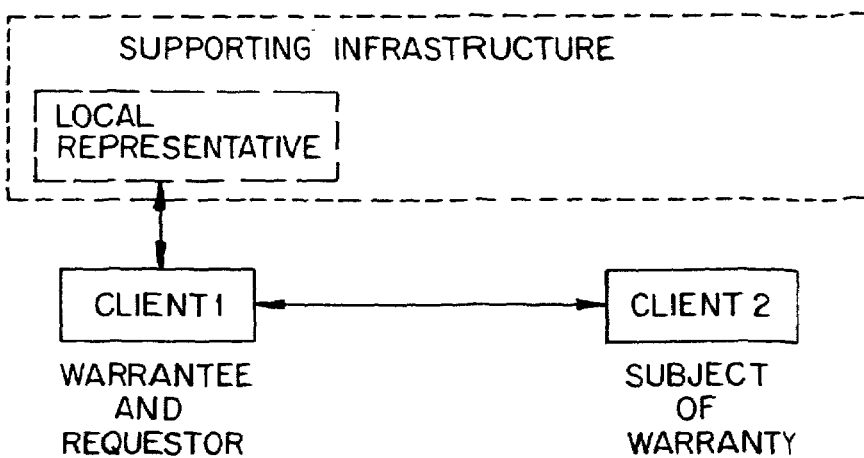
FIGS. 2 and 3 are block schematic diagrams illustrating two possible connection configurations for implementing a warranty-granting transaction according to the invention.
Figure 3:
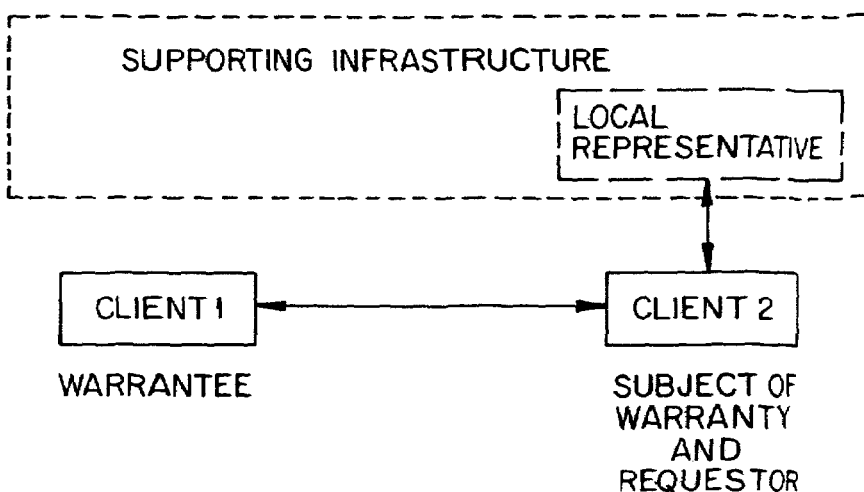

These two possible roles can be associated with the two possible communication configurations shown in FIGS. 2 and 3, respectively. Each of these configurations only requires one client to be connected to its local representative.

It will be noted that the relationship between the supporting infrastructure and the clients is different for the two roles. In the case of FIG. 3, the interaction is simplified in the sense that a single local representative would be able to both determine the ability of Client 2 to meet the requirements of the transaction as well as arrange for payment of any fees associated with providing the warranty. In the case of FIG. 2, the situation is more complex since Client 1 is paying for the warranty but the ability of Client 2 to support the transaction is the primary issue.

Figure 4:
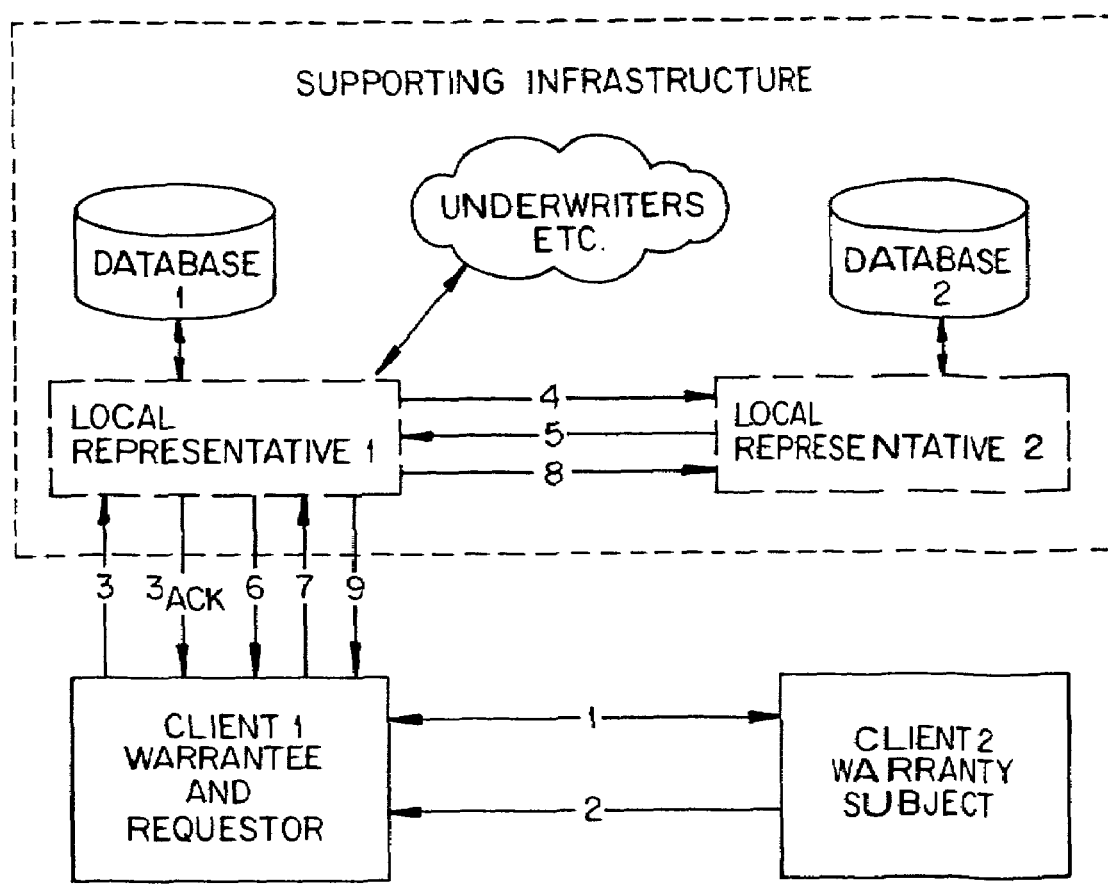
FIG. 4 is a block schematic diagram illustrating an exemplary warranty-granting transaction according to the invention.

An embodiment of a system for implementing the invention is shown in FIG. 4 and is composed of a supporting infrastructure made up of a plurality of local representatives. Each local representative may be some type of financial institution, such as a bank, a certification authority, an insurance company, an underwriter, etc. The supporting infrastructure may be composed of some or all institutions in a local area, in an entire country, a multinational region, or the entire world. The local representatives are linked together by appropriate communications channels having whatever degree of security is considered necessary.

Each local representative may include a computer system, a data storage system coupled to the computer system and storing a database and some type of transceiver, such as a modem, for communicating with parties who have an established relationship with the local representative and who are referred to herein as clients. Each client may be an individual or business entity. The database contains all relevant information about clients of the local representative.

Each client has an associated computer system programmed to at least receive, store and transmit data, a transceiver, such as a modem, configured to establish a communication link with its associated local representative and a communication device, which may be the same transceiver, for communicating with another party.

The supporting infrastructure will be used to aid transactions between two parties, who may be clients of the same local representative or of different local representatives, by examining information about at least one of the parties together with information about the transaction and then, if the results of the examination permit, issuing a warranty of performance of contractual obligations by one of the parties to the transaction.

As is illustrated in FIG. 4, one feature of the present invention resides in the fact that communication with the supporting infrastructure need be conducted by only one party to the transaction, in this case client 1 who is negotiating a transaction with client 2. Clients 1 and 2 are here clients of respectively different local representatives, 1 and 2, respectively.

In the system described above, the invention is implemented by an exchange of messages, which can take the form described below. It is assumed that the following exchange of messages takes place after clients 1 and 2 have agreed to enter into a contract to conduct a transaction. Prior to this agreement, clients 1 and 2 will have exchanged information relating to specific aspects of the transaction and their ability to complete the transaction. This transaction places certain obligations on client 2 and client 1 wishes to obtain assurance, in the form of a warranty from a known, reliable party, that client 2 at least has the ability to honor the obligations. Thus client 1 is the potential Warrantee and the warranty requester, while client 2 is the subject of the warranty, and local representative 1 is being asked to issue the warranty, and is therefore the warrantor.

Message 1

Message 1 contains a description of the agreed-upon final version of the transaction along with information which forms the basis for warranty request. It is expected that this information in message 1 (as well as any preceding messages) may be encrypted and possibly signed. However, such protection, which would be produced my known means, is not an essential feature of the present invention and therefore will not be further discussed herein.

Message 2

Message 2 contains the following fields a) through h):

a) Identification of the warranty subject (Client 2)—in a form that can be uniquely recognized by the supporting infrastructure. Any information which Local Representative 1 will need in order to locate Local Representative 2 within the supporting infrastructure is included;

b) Identification of Warrantee (Client 1)—based on information previously received by client 2 from the Warrantee and should support unique identification of the Warrantee within the supporting infrastructure;

c) Desired class for Warrantee—information specifying the minimum standards that the Warrantee must meet in order to be issued a warranty on this transaction or to be provided other non-public information about the warranty subject;

d) Transaction count—warranty subject—a parameter that is meaningful to the warranty subject and his bank (local representative 2). The warranty subject will generate the count by incrementing the previous count by one;

e) Warranty parameter categories—identify information held by local representative 2 which is believed to be relevant to the subject transaction. This information is based on such things as the credit rating of the warranty subject, standing in industry and related information based on the history of the warranty subject;

f) Coverage limit—warranty coverage limit supported by the warranty subject for this transaction;

g) Time period of coverage—the effective time period for the warranty designated by the warranty subject;

h) Transaction element categories—one desirable feature of a system according to the invention is that it offers the possibility of limiting the information provided to the infrastructure, the "Transaction element categories" field provides a means of providing limited information related to this specific transaction which would be relevant to supporting the warranty;

i) Signature of warranty subject (client 2) on fields (b) through (h)—The warranty subject signs the concatenation of the information listed and a cryptographic hash of the transaction. Notice that the cryptographic hash of the transaction is not included as an element of message 2. The nature, creation and use of a cryptographic hash is fully described in Schneier, supra.

Examples of information that may be contained in the Transaction element categories field include identification of the transaction as covering agricultural goods, which may be relevant to the time period of the warranty, as it would be to a Letter of Credit issued by the Export Import Bank, or the warranty may be sensitive to the possible military use of the goods. In some cases the ability to issue a meaningful warranty must take into consideration the contents of the transaction.

Note should be taken that the difference between "Warranty parameter categories" and "Transaction element categories" is that the "Warranty parameter categories" field is a direction from the warranty subject to Local Representative 2 that identifies information on the warranty subject which may be released for the purposes of supporting this transaction. While this information may support the transaction, it is based not on the transaction, but on the history and status of the warranty subject, including the record of the warranty subject's prior executed transactions. Note that it is outside the flow of the presently described system to track the status of transactions beyond the issuance of the warranty. The "Transaction element categories" are related directly to the nature and content of the transaction.

Message 3

Message 3 is from the Warrantee (Client 1) to its local representative (Local Representative 1) requesting that a warranty be issued. The signed message from the Warrantee contains:

a) Identification of the warranty subject—identical to field a) of Message 2;

b) Transaction count Warrantee—a parameter that is meaningful to the Warrantee and his bank (Local Representative 1). The Warrantee will generate the count by increment one from the previous count;

c) Coverage limit requested—the warranty coverage desired by the Warrantee;

d) Hash of transaction—The Warrantee forms a hash of his copy of the final transaction agreement. This hash should be identical to the hash formed by the warranty subject as a part of computing the signature for message 2;

e) Signed portion (i.e., fields (b)—(i)) of Message 2 from warranty subject. Local Representative 1 can uniquely identify the Warrantee by the information contained in item (e);

f) Warrantee Transaction element descriptions—In cases in which the agreement or the warranty is based on underlying details contained in the transaction, those elements of the transaction which are important to the Warrantee and the usefulness of the warranty he will receive will be listed in the 'Warrantee Transaction element descriptions'. It is assumed that the form of this information was based on information obtained from the warranty subject during negotiation of the transaction, and is related to the 'transaction element categories' identified by the warranty subject in message 2. These Warrantee Transaction element descriptions may be transmitted within message 1. It is in the Warrantee's interest to ensure that these descriptions depict an accurate summary of all of the salient characteristics of the transaction. An "illicit" transaction may result in rejection of a warranty claim.

Message 3 may be structured so as to address encryption/authentication aspects of the message and/or subsequent messages between Local Representative 1 and the Warrantee.

Message 3 Acknowledgment ($3_{ACK}$)

Message 3 acknowledgment is provided to the Warrantee as an indication that message 3 was received and that it contained the required information from the client to support processing. It also would provide a path for immediately indicating that a warranty will not be issued if Local Representative 1 could determine this without additional information. An example of such a situation would be the appearance of Client 2's identification on a list, held by Local Representative 1, which identified clients that are barred from being warranty subjects.

In the case of complex transactions, the time span between the Warrantee receiving message $3_{ACK}$ and message 6 may be unpredictable. This is due to the possible need for Local Representative 1 to obtain additional support for the warranty (such as underwriter support) as well as the possibility that Local Representative 2 may require time in order to obtain additional information. In many cases this additional support may require review by humans and would not be fully automated. To the extent possible, Message $3_{ACK}$ should provide an estimate of the required processing time as well as providing the necessary communication and security basis for future messages. In particular messages from Local Representative 1 to the Warrantee would require encryption in order to provide adequate protection of information about the warranty subject. Of course it is expected that any such information provided to the Warrantee would be held as sensitive information. (The Warrantee would have agreed to this as part of a contract with his local representative. This could be augmented by signed information within Message 3.) This structure for the messages allows fast response where possible while still accommodating delayed responses where required.

Message 4

Message 4 is internal to the supporting infrastructure and as such its security is assumed to be provided by conventional infrastructure components which are not described in detail herein. Message 4 includes the components from Message 2 as created by the warranty subject plus the hash of the transaction created contained in Message 3 as created by the Warrantee. Notice that since the hash of the transaction as created by the Warrantee should be identical to the hash of the transaction as created by the warranty subject, the signature on this information as created by the warranty subject should be correct.

Message 4 contains:

a) Signed Message 2 from Warranty Subject b) Identification—Warranty Subject c) Transaction count—Warrantee d) Information related to the Warrantee Upon receipt of Message 4, Local Representative 2 performs a sequence of processes as described herebelow.

First, the signature on Message 2 is verified to be the correct signature of the Warranty Subject, or to authenticate the message origin.

In order to detect the presence of a repeated message Database 2 maintains a list of the N most recently processed transaction count values for each client. A message is not considered to be a valid new request unless the 'Transaction count—Warranty Subject' is not contained in the database and is greater in value than the lowest transaction count retained in the database.

The "Desired class for Warrantee" from Message 2 is compared with information provided in field d) of Message 4. This will be used by Local Representative 2 to make a support/non-support decision.

The data available for the Warranty Subject will be reviewed for compatibility with maximum reasonable warranty coverage limits as well as the total coverage limits outstanding. This will require that all pending requests for warranties and the related status of these requests (as reported in Messages 8 (to be described below) of previous transactions involving the same Warranty Subject) have been accounted for. As a result a support/not-support decision can be reached.

The actual processing of the transaction is outside the exchanges which are the subject of this invention. As a result the decision process may include consideration of warranties which were issued but did not actually result in completion of the associated transactions.

It is expected that the local representatives will use knowledge concerning their clients which is verifiable outside of the exchanges of this system. This is necessary since the system does not in general follow the details of the transaction through its completion.

If the issuing of a warranty is supported, the Transaction element categories will be used to form the 'Database Transaction element descriptions'.

Message 5

Message 5 is internal to the supporting infrastructure and as such its security is assumed to be provided by conventional infrastructure components which are not described in detail herein.

Message 5 includes:

a) Identification of Warrantee;

b) Transaction count, Warrantee;

c) Support/not-support decision;

d) Warranty parameters as listed in the warranty parameters categories;

e) Coverage limit authorized (Not Applicable if not supported);

f) Database Transaction element descriptions. (Not Applicable if not supported);

g) Reason for a not-support decision (Not Applicable if supported).

Upon receipt of Message 5, Local Representative 1 performs processes as described herebelow.

Assuming that message 5 indicated that the transaction is to be supported, a comparison will be made between the Warrantee Transaction element descriptions (Message 3) and Database Transaction element descriptions (Message 5). A discrepancy will prevent providing a warranty. Information available to Local Representative 1 may also be used to adjust relevant parameters (such as time period) in the warranty.

Message 6

Message 6 provides the status of the warranty. Assuming that issuance of the warranty has been approved, it can also provide cost information associated with the warranty as well as any information required to initiate receiving of the warranty as well as any restrictions on the purchase of the warranty (for example time limit for purchase).

In addition, message 6 will provide a report based on the warranty parameters as provided by the Warranty Subject's Local Representative (as extracted from message 5) and may also provide relevant information related to the Database Transaction element descriptions (as extracted from Message 5) and contrasted against the Warrantee Transaction element descriptions.

In accordance with requirement 7, the transfer of information relevant to the Warranty Subject is limited as defined by the Warranty parameter categories and Transaction element categories contained in message 2.

It is important to note that message 6 is not the warranty but is an offer to sell the warranty. It is constructed such that misinterpretation is unlikely.

Message 7

Message 7 is an agreement by the Warrantee to accept, and pay for, the warranty.

Message 8

Message 8 is internal to the supporting infrastructure and as such its security is assumed to be provided by conventional infrastructure components which are not described in detail herein.

Message 8 includes:

a) Identification—Warranty Subject—based on information in Message 2;

b) Transaction count—identified in Message 2;

c) A statement of issued/non-issued status of the requested warranty, generated by Local Representative 1 and indicating the final status of the request related to this transaction;

d) Final coverage value, when coverage approved for this transaction.

The nature and content of each of these fields will be apparent from the description of earlier messages.

Message 9

Message 9 is a signed indication of the warranty. It contains:

a) Identification—Warranty Subject—based on information in Message 2;

b) Identification—Warrantee—based on information in Message 2 c) Transaction count (used with Identification—Warranty Subject as pointer in database 2)—based on information in Message 2;

d) Transaction count Warrantee (used with Identification—Warrantee as pointer in database 1)—based on information in Message 3;

e) Hash of transaction—based on information in Message 3;

f) Final coverage value, when coverage approved for this transaction;

g) Time period of coverage, which will usually agree with period requested in Message 2g).

The nature and content of each of these fields will be apparent from the description of earlier messages.

Message 9 may also contain information relating to specific aspects of coverage, such as the warranty parameters, if these values are guaranteed to be "accurate" at the time they were compiled, where the determination of accuracy is in accordance with the initial contract between Local Representative 1 and Client 1, the Warrantee.

Fees to the Supporting Infrastructure

It is envisioned that a fee will be charged to the Requestor (the Warrantee in the case under consideration) only if a warranty was approved and issued. While this practice does not provide fees for requests which are either denied by the system or not acceptable to the Warrantee, it does prevent inappropriate fees from being charged to the Requestor as a result of requests involving security shortcomings in security structures outside of this system (e.g. an impostor posing as the Warranty Subject ). The collection of the fee is enabled by the ability of Local Representative 1 to consolidate payments for services provided (with appropriate payment-authorization provided by the client which directly contacts the warranty-granting infrastructure backend). No charge is made to the other client involved in the transaction.

While not envisioned as the primary method for providing fees for the supporting infrastructure, a more general fee structure could support fees for a plurality of levels of service. For example, the first level would involve a fee assuming that the process ended with the Message 3 acknowledgment. The second level would be if the process ended at Message 6 without the issuance of a warranty. The third level would include the issuance of the requested warranty.

It is envisioned that fee payments can be made by employing known electronic payment systems, which are described in Schneier, supra.

Specific Example

There will now be presented a specific example of a typical warranty issue process. Of course, this is one of many possible examples but was chosen to represent some of the capabilities of the described system. In this example, the Warranty Subject is known by the supporting infrastructure to be a provider of software and cryptography. It will also be assumed that the Warranty Subject is a company in the US and therefore subject to export controls for the delivery of cryptography outside the US. In this example it will be assumed that the Warrantee is a non-US company.

The transaction developed between the Warranty Subject and the Warrantee will be for the delivery of software which contains cryptographic capabilities. In addition, it will be assumed that the Warranty Subject is attempting to cheat and has not obtained the necessary US export authorization.

In this case, the Warranty Subject would include in the "transaction element categories" of Message 2 only the category for software and not include the fact that the software also contained cryptography. In Message 3, the Warrantee should ensure that the "Warrantee transaction element descriptions" include all descriptors which he feels are important to the transaction. It is assumed here that he included both cryptography and software as descriptors.

Message 4 will contain the transaction element categories of Message 2 and will return in Message 5 matching database transaction element descriptions. Upon receiving Message 5, Local Representative 1 will check for a discrepancy between the "database transaction element descriptions" of Message 5 and the "Warrantee Transaction element descriptions" of Message 3. In this example the discrepancy would prevent a warranty from being issued.

It will be noted that the Warrantee has the burden of insuring that the "Warrantee Transaction element descriptions" of Message 3 were sufficiently complete to provide protection. If the Warrantee had included only software in the "Warrantee Transaction element descriptions" the warranty would have been issued.

If the transaction had later failed to be completed (perhaps as a result of the export controls), the Warrantee might have tried to make a claim against the warranty. In processing the claim the supporting infrastructure would have obtained the complete transaction and discovered that it was in violation of law and therefore not subject to warranty protection.

On the other hand if the Warranty Subject had included the cryptographic "Transaction element category" in Message 2, this along with "information related to the Warrantee" of Message 4 would allow Local Representative 2 to detect a questionable transaction, in this case because of the non-US status of the Warrantee.

It should be noted that the issue here is not one of export control, but rather the legitimacy or legality of the transaction in the context of warranty coverage as defined in contracts between Local Representative 1 and Client 1 and between Local Representative 2 and Client 2. The extent of the actual coverage provisions may vary. For example, coverage may deal strictly with guaranteeing the accuracy of the delivered warranty parameter information, or may guarantee certain aspects of actual transaction fulfillment to be carried out by the Warranty Subject. Even if certain transaction aspects are guaranteed, the Warrantee may want to use warranty parameter information to make a judgment on whether to expend the resources necessary to further pursue the transaction. In fact, the entire warranty process, as defined in the message flows, may be iterated during the transaction negotiation between the two clients. The incorporation of transaction element and warranty parameter categories enables automation and facilitates handling of access control and privacy requirements.

Other examples of procedures according to the invention may deal with the sale and delivery of morphine to licensed pharmacies, or with the shipment of hazardous waste materials to sites which must be licensed as demonstrable proof that they are equipped to deal with containment.

Communication within the supporting infrastructure, between clients and between each local representative and client can be conducted in currently existing as well as future telecommunications environments using currently available and future computing equipment and operating systems. Such a telecommunications environment could include the current implementation of the internet as well as dialup and private network communications. The computing equipment and operating systems would include the types of computers and operating systems in wide use by businesses and individuals (PCs, Win95, Win-NT, . . . ) as well as special computer systems that might be used by banks. It would also be possible to use specially designed, or dedicated, hardware. There are several possible reasons for doing this. One reason would be to improve the security of the system and counter some of the security shortcomings that exist in many current computer/operating systems. The other reason for using special hardware would be to improve performance, primarily of cryptographic functions.

Control of message exchanges will be effected by software including software components operating on commercial computers, which software would normally be compatible with widely used commercial operating systems.

The software components required for implementation of the present invention include:

a) communications software;

b) processing software;

c) database software.

The communications software can be selected from a wide array of existing communication software and the choice will depend on the type of network/communication interface provided. For most client applications it is envisioned that commercially available browser software would provide much of the required communication capability. In many cases, use can be made of communication software which is already resident in current state-of-the-art computers that could be employed to implement this invention.

The processing software can include a custom application package which may call commercially available special purpose processing software packages. Examples of these special purpose processing packages include Graphic User Interface (GUI) software for the purpose of displaying information on the computer screen as well as available cryptographic software in order to provide the cryptographic functions required by the invention. Examples of such cryptographic software include MS CAPI™ from Microsoft and CDSA™ (Common Data Security Architecture—from Intel). Implementation of the invention requires the integration of the user interface and cryptographic functions and the creation of appropriate interfaces with the communication software and database software resident on the computer.

The required implementation would require a modest investment of a software design team for client level software and a somewhat greater investment for the bank, or local representative, software.

The remaining component required for implementation of the invention is a database. This would be provided by using any one of a number of commercially available database software products. In many cases a suitable database software product would already be available on the computer.

It is envisioned that software installation for components of the supporting infrastructure will be performed according to standard procedures by information technology experts who provide technical support for those components. For clients, the required software will be provided by their local representative (bank) using one of several standard software delivery methods such as physical distribution of disks or CDROMs or using, electronic distribution, e.g. via the internet.

The software will provide the ability to accept direction from the user through the GUI. The required message structure can be formed based on the user direction as well as information in the database. The information can be protected during transmission and verified at various points in the system by using digital signature capabilities (such as the Digital Signature Algorithm (DSA), another type of digital signature algorithm commonly known as RSA, or the Elliptic Curve DSA (ECDSA) which are provided in available cryptographic software packages. The DSA and RSA are described in Schneier, supra.

Pending U.S. application Ser. No. 08/767,257, filed by Asay et al on Dec. 13, 1996, contains subject matter which is related to the present application; accordingly, the entirety of that pending application is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for providing a warranty relating to a transaction between two parties, each party having a data communications device, said system comprising an infrastructure composed of a plurality of locations each associated with a respective institution which provides services to clients, each location having a computer system, a database coupled to the computer system and storing information about each client of the institution and a data communications device coupled to the computer system for communication with the data communications device of any one party, each party being a client of at least one of the institutions, wherein each said location comprises means for exchanging stored information with every other location, means for creating a warranty relating to either party to the transaction in response to a request received from at least one of the parties which is a client of the respective institution and based on information about the two parties contained in at least one of the databases and information about the nature of the transaction received from the one of the parties, and means for receiving information from the institution of the other party indicating whether that institution would support or not support the warranty.

2. A method for facilitating provision of a warranty relating to a transaction between two parties, each party having a data communications device, in a system comprising an infrastructure composed of a plurality of locations each associated with a respective institution which provides services to clients, each location having a computer system, a database coupled to the computer system and storing information about each client of the institution and a data communications device coupled to the computer system for communication with the data communications device of any one party, each party being a client of at least one of the institutions, said method comprising:
   receiving a request for a warranty from one party to the transaction which is a client of the respective institution to a respective location associated with the respective institution, which request includes information identifying the other party to the transaction and information about the nature of the transaction;
   receiving information to the respective location from a location associated with an institution of which the other party is a client, the information indicating whether the institution of which the other party is a client would support or not support the warranty; and
   transmitting a response to the request from the respective location to the one party.

3. A method for aiding a plurality of different transactions carried out electronically between a plurality of parties wherein two of the plurality of parties are associated with a specific transaction, the two parties being party A and party B, respectively, said method comprising:
   receiving, from party B to an institution of a plurality of institutions in an infrastructure wherein communications systems interconnect the institutions, an electronic request for a warranty that requirements that must be met by party A or party B to carry out the specific transaction are or will be met;
   sending first electronic information from the institution to another institution, the first electronic information including identification information regarding party A and information about the nature or content of the specific transaction;
   receiving second electronic information to the institution from the other institution, the second electronic information including information about the nature or content of the specific transaction; and
   providing, from the institution to party B, a response regarding the status of the requested warranty.

4. The system of claim 1, wherein the institutions comprise financial institutions.

5. The system of claim 1, further comprising means for sending from the institution of the one of the parties to the institution of the other party a message including unique information from a message transferred between the parties regarding the transaction.

6. The system of claim 1, further comprising means for sending from the institution of the one of the parties to the institution of the other party information that includes:
   an identification of the one of the parties;
   a statement of issued/non-issued status of the requested warranty; and
   if the requested warranty is issued, a final coverage value when coverage is approved for the transaction.

7. The system of claim 1, wherein the means for creating the warranty further comprises means for receiving information from the one of the parties, the information including two or more items of information selected from the following:
   an identification of the other party;
   a coverage limit requested;
   unique information regarding the transaction between the one of the parties and the other party; and
   a signed portion of a message from the other party to the one of the parties.

8. The system of claim 1, wherein the information indicating whether the institution of the other party would support or not support the warranty is information regarding the nature of the transaction and the system further comprises means for comparing the information about the nature of the transaction received from the one of the parties with the information regarding the nature of the transaction received from the institution of the other party.

9. The method of claim 2, wherein the institutions comprise financial institutions.

10. The method of claim 2, further comprising sending from the respective location to the location associated with the institution of which the other party is a client a message including unique information from a message transferred between the parties regarding the transaction.

11. The method of claim 2, wherein the information includes:
   an identification of the one party;
   a support/not-support decision;
   if a support decision, a coverage limit authorized;
   if a not-support decision, information about the nature of the transaction; and if a not-support decision, a reason for the not-support decision.

12. The method of claim 2, further comprising sending from the respective location to the location associated with the institution of which the other party is a client, information that includes:
   an identification of the one party;
   a statement of issued/non-issued status of the requested warranty; and
   if the requested warranty is issued, a final coverage value when coverage is approved for the transaction.

13. The method of claim 2, wherein receiving a request for a warranty from the one party comprising receiving information that includes two or more items of information selected from the following:
   an identification of the other party;
   a coverage limit requested;
   unique information regarding the transaction between the one party and the other party; and
   a signed portion of a message from the other party to the one party.

14. The method of claim 2, wherein the information indicating whether the institution of which the other party is a client would support or not support the warranty is information regarding the nature of the transaction and the method further comprises comparing the information about the nature of the transaction received from the one party with the information regarding the nature of the transaction received from the institution of which the other party is a client and to use the result in the creating the warranty.

15. The method of claim 2, further comprising being able to handle the request for the warranty where the one party is the warrantee and the other party is the subject of the warranty and where the one party is the subject of the warranty and the other party is the warrantee.

16. The method of claim 3, wherein the institutions comprise financial institutions.

17. The method of claim 3, further comprising managing information about party A and party B, including information about outstanding warranties for each of party A and party B and transactional administrative information.

18. The method of claim 3, further comprising being able to handle the request for the warranty where party B is the warrantee and party A is the subject of the warranty and where party B is the subject of the warranty and party A is the warrantee.

19. The method of claim 3, further comprising evaluating the information about the nature or content of the specific transaction received from the other institution and using the result of the evaluation in providing the response regarding the status of the requested warranty.

20. The method of claim 3, wherein receiving the request for the warranty further comprises receiving two or more items of information selected from the following:
   an identification of party A;
   a coverage limit requested;
   unique information regarding the specific transaction; and
   a signed portion of a message from party A to party B.

* * * * *